(12) United States Patent
Day et al.

(10) Patent No.: US 8,744,664 B2
(45) Date of Patent: Jun. 3, 2014

(54) PATH DETERMINATION

(75) Inventors: Peter Stephen Day, Bristol (GB); David Andrew Wragg, Pocklington (GB)

(73) Assignee: Bae Systems plc (GB)

( * ) Notice: Subject to any disclaimer, the term of this patent is extended or adjusted under 35 U.S.C. 154(b) by 148 days.

(21) Appl. No.: 13/390,889

(22) PCT Filed: Sep. 7, 2010

(86) PCT No.: PCT/GB2010/051484
§ 371 (c)(1),
(2), (4) Date: Feb. 16, 2012

(87) PCT Pub. No.: WO2011/027178
PCT Pub. Date: Mar. 10, 2011

(65) Prior Publication Data
US 2012/0150379 A1   Jun. 14, 2012

(30) Foreign Application Priority Data

Sep. 7, 2009  (EP) ..................................... 09275070
Sep. 7, 2009  (GB) ................................... 0915542.5

(51) Int. Cl.
*G01C 22/00* (2006.01)
*G05D 1/02* (2006.01)
*G01C 21/34* (2006.01)

(52) U.S. Cl.
CPC .............. *G05D 1/0278* (2013.01); *G01C 21/34* (2013.01); *G01C 21/3492* (2013.01)
USPC .............. 701/25; 701/420; 701/423; 701/468

(58) Field of Classification Search
CPC .................... G05D 2201/0209; G05D 1/0278; G01C 21/34; G01C 21/3492
USPC .................................... 701/25, 420, 423, 468
See application file for complete search history.

(56) References Cited

U.S. PATENT DOCUMENTS

| 5,517,098 | A | | 5/1996 | Dong |
| 5,919,239 | A | * | 7/1999 | Fraker et al. .................. 701/473 |
| 6,014,080 | A | * | 1/2000 | Layson, Jr. ................. 340/573.1 |
| 6,834,220 | B1 | | 12/2004 | Bail |
| 6,952,574 | B2 | * | 10/2005 | Tealdi et al. ............... 455/404.2 |
| 6,972,719 | B1 | * | 12/2005 | Swope et al. ................. 342/450 |

(Continued)

FOREIGN PATENT DOCUMENTS

| CN | 201237738 Y | 5/2009 |
| KR | 2008-0042782 A | 5/2008 |

OTHER PUBLICATIONS

Strunk and White, The Elements of Style, 3$^{rd}$ Ed., 1979, all pages.*
"Mean", Wikipedia, all pages, date unknown.*

(Continued)

*Primary Examiner* — Calvin Cheung
(74) *Attorney, Agent, or Firm* — Finch & Maloney PLLC

(57) ABSTRACT

A system for controlling a vehicle to follow at least one person includes a detection device for detecting a location of at least one person. The system further includes a storage device for recording locations of at least one person at a plurality of points in time, and a path determination device for determining a driveable path for a vehicle based on the recorded locations. The system further includes a control device for operating vehicle to follow one or more persons over the driveable path.

11 Claims, 14 Drawing Sheets

(56) References Cited

U.S. PATENT DOCUMENTS

| | | | |
|---|---|---|---|
| 7,103,447 B2* | 9/2006 | Di Profio et al. | 700/245 |
| 7,228,203 B2* | 6/2007 | Koselka et al. | 700/245 |
| 7,551,980 B2* | 6/2009 | Sakagami et al. | 700/258 |
| 8,077,030 B2* | 12/2011 | Kaminski et al. | 340/539.13 |
| 8,139,109 B2* | 3/2012 | Schmiedel et al. | 348/118 |
| 8,346,391 B1* | 1/2013 | Anhalt et al. | 700/248 |
| 8,432,442 B2* | 4/2013 | Nam et al. | 348/135 |
| 8,447,440 B2* | 5/2013 | Phillips et al. | 701/2 |
| 8,510,029 B2* | 8/2013 | Curtis et al. | 701/301 |
| 8,594,844 B1* | 11/2013 | Gal | 700/246 |
| 2003/0130987 A1* | 7/2003 | Edlund et al. | 707/3 |
| 2004/0046667 A1* | 3/2004 | Copley | 340/573.4 |
| 2004/0049324 A1* | 3/2004 | Walker | 701/1 |
| 2004/0073360 A1* | 4/2004 | Foxlin | 701/207 |
| 2005/0192026 A1* | 9/2005 | Carlson et al. | 455/456.1 |
| 2006/0064203 A1* | 3/2006 | Goto et al. | 700/245 |
| 2006/0070558 A1* | 4/2006 | Chiu | 109/2 |
| 2006/0106496 A1 | 5/2006 | Okamoto | |
| 2007/0100496 A1* | 5/2007 | Forell | 700/245 |
| 2007/0150106 A1* | 6/2007 | Hashimoto et al. | 700/245 |
| 2007/0150195 A1* | 6/2007 | Koskan et al. | 701/221 |
| 2007/0199108 A1* | 8/2007 | Angle et al. | 901/17 |
| 2008/0079383 A1 | 4/2008 | Nakamoto | |
| 2008/0108370 A1* | 5/2008 | Aninye | 455/456.1 |
| 2008/0154504 A1* | 6/2008 | Hein et al. | 701/300 |
| 2008/0253613 A1* | 10/2008 | Jones et al. | 382/103 |
| 2009/0102707 A1* | 4/2009 | Elwell et al. | 342/357.01 |
| 2009/0125225 A1* | 5/2009 | Hussain et al. | 701/200 |
| 2009/0143079 A1 | 6/2009 | Klassen et al. | |
| 2009/0180668 A1* | 7/2009 | Jones et al. | 382/103 |
| 2011/0172850 A1* | 7/2011 | Paz-Meidan et al. | 701/2 |
| 2013/0054029 A1* | 2/2013 | Huang et al. | 700/259 |
| 2013/0123980 A1* | 5/2013 | Seo | 700/248 |
| 2013/0325182 A1* | 12/2013 | SETRAKIAN et al. | 700/264 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Mar. 22, 2012, in the corresponding International Application No. PCT/GB2010/051484. (10 pages).

International Search Report (PCT/ISA/210) issued on Nov. 5, 2010, by European Patent Office as the International Searching Authority for International Application No. PCT/GB2010/051484.

European Search Report issued on Mar. 30, 2010 for Application No. 09275070.2.

United Kingdom Search Report issued on Jan. 11, 2010 for Application No. 0915542.5.

* cited by examiner

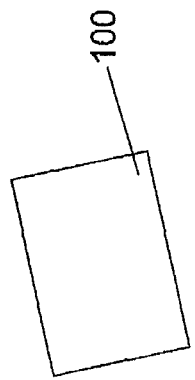
Figure 13

PATH DETERMINATION

BACKGROUND TO THE INVENTION

The present invention relates to determining a path for a vehicle to follow at least one person.

OBJECTS OF THE INVENTION

There is a need for a robust system of path determination for ground vehicles, which may be at least partially autonomous/unmanned, as many factors need to be taken into account.

Embodiments of the present invention are intended to provide such a robust path determination method.

SUMMARY OF THE INVENTION

According to one aspect of the present invention there is provided a system for controlling a vehicle to follow at least one person, the system including:

a detection device for detecting a location of at least one person;

a storage device for recording said locations of said at least one person at a plurality of points in time;

a path determination device for determining a driveable path for a vehicle based on the recorded locations; and a control device for operating said vehicle to follow said one or more persons over the driveable path.

The detection device may detect a location signal transmitted by at least one Global Navigation Satellite Systems (GNSS), e.g. GPS, enabled handheld device (typically carried by the at least one person) that transmits location signals at intervals in time back to system.

Advantageously, the system is located on or in the vehicle.

The system may detect and store location data for a plurality of said persons and may be configured to follow one said person selected from amongst the plurality of persons. The system may be configured to select a said person based on a plurality of operating modes. The modes may include: follow one nominated said person; follow a computed centroid of the plurality of persons; and/or automatically switch between said persons based on an operational context, e.g. switch from a first said person to a second said person if the first person moves away a certain distance from the other persons.

The vehicle can, if ordered, stop following one said person and start following another said person, provided it has been recording the locations of both said persons in order to determine the driveable path.

The system may be configured to receive signals from at least one sensing device and the path determination device may use the signals to determine a path that avoids collision with a said person or un-driveable terrain.

The path determining device may:

compute vectors corresponding to the stored locations of the person being followed;

perform a curve-fitting operation to determine a path between the stored locations.

Non-linear optimisation techniques may be used to calculate a vector between a pair of said stored locations.

According to another aspect of the present invention there is provided a method of controlling a vehicle to follow at least one person, the method including:

detecting a location of at least one person;

recording said locations of said at least one person at a plurality of points in time;

determining a driveable path for the vehicle based on the recorded locations; and operating the vehicle to follow said one or more persons over the driveable path.

According to yet another aspect of the present invention there is provided a computer program product comprising a computer readable medium, having thereon computer program code means, when the program code is loaded, to make the computer execute a method substantially as described herein.

DESCRIPTION OF THE DRAWINGS

The invention may be performed in various ways, and, by way of example only, embodiments thereof will now be described, reference being made to the accompanying drawings with like reference numerals in which:

FIG. 13 is a drawing illustrating the first step in how a vehicle overrides the process of following "digital breadcrumbs" and goes to a specific point as quickly and directly as possible according to an embodiment of the invention.

DESCRIPTION OF PREFERRED EMBODIMENT

Figure 1:
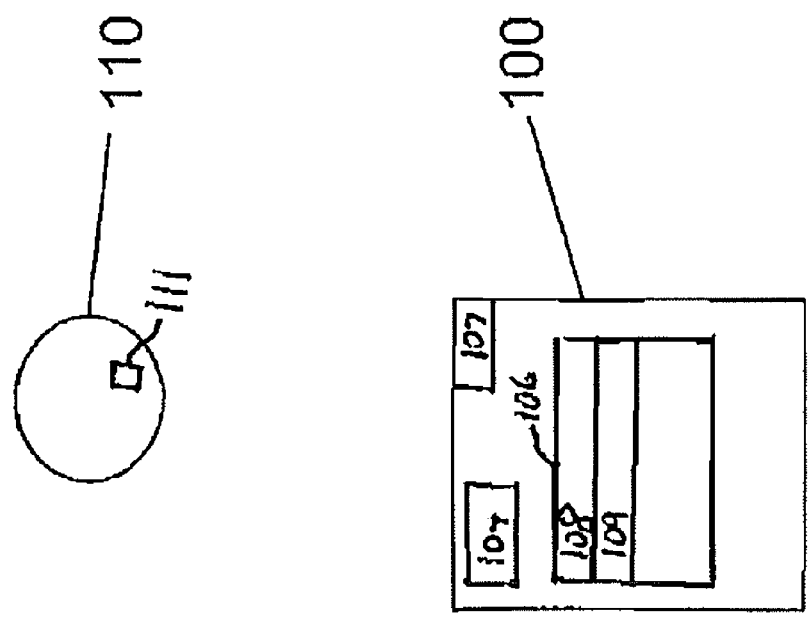
FIG. 1 is a drawing showing a vehicle and a person.

Referring now to FIG. 1, there is shown a person 110 and a vehicle 100. The vehicle is typically at least partially autonomous and in some cases may be controlled remotely. The vehicle is fitted with a computing device 102 having a processor 104, a memory 106 and a communications interface 107. The memory 106 includes code 108 for configuring the computer to perform a method as described herein as well as a data store 109 for storing data used by the method. The computing device may directly control the vehicle's driving mechanisms. The person 110, in the preferred embodiment, carries a handheld device 111 equipped with a GNSS, e.g. GPS, location sensor and which is in regular and constant communication with the vehicle 100 over a wireless network such as 802.11g or similar, and can be received by the interface 107. The handheld device, for example, can be one of many portable computing devices ranging from a mobile phone to a laptop or tablet computer, either in a standard consumer configuration or ruggedised. Alternatively, several different types of device can be used depending on command structure, with the commander being provided with a laptop with full command functionality and the rest of a group being provided with handheld personal digital assistants (PDAs) or mobile phones.

Alternatively, rather than carrying a hand-held device, the vehicle 100 could be equipped with sensors, for example LIDAR or mm-wave RADAR, to detect the person(s) 110 it is meant to follow to enable the vehicle to determine that persons position at regular intervals relative to the position of the vehicle. If the vehicle is equipped with GPS, then it can plot this relative position and determine a GPS position for that person 100.

In the case where the vehicle 100 is not equipped with GPS capability, or where the vehicle is in a GPS-denied environment, a navigation filter that fuses together a number of different navigation sources, such as an inertial measurement unit (IMU), odometry and simultaneous location and mapping (SLAM) data may be used. For example, odometer data from the wheels of the vehicle could be used to determine the distance travelled and use of odometer data from all wheels allows a degree of compensation for skidding etc.

In a further alternative, the person or persons 110 that the vehicle 100 is following could be tagged with some form of electronic marker to identify them/their location to the vehicle, e.g. a RFID tag or GPS tracking tag as a separate item from any handheld device(s) with which the person or persons 110 can issue orders to the vehicle 100. These tags need to be readable by the vehicle 100, i.e. by the tags actively transmitting to the vehicle or by the vehicle 100 interrogating passive tags at regular intervals.

The vehicle 100 needs to know the positions of the person 110 over time by some means and these positions at intervals in time are signals hereby termed "digital breadcrumbs" 120. Preferably, these digital breadcrumbs 120 are generated at regular intervals, for example once a second, and the position information for the person 110 stored in the digital breadcrumb is stored, preferably in the vehicle computer's data store 109, although in other embodiments the computer for controlling the vehicle could be located remotely from the vehicle.

As the person 110 moves they leave, along the route they take, a virtual trail of these digital breadcrumbs 120 for the vehicle 100 to follow.

Before, during or after moving, the person 100 can use the hand-held device to order the vehicle 110 into "follow-me" mode, i.e. to follow their digital breadcrumb trail.

The vehicle 100 can continuously store digital breadcrumbs for all of the people 110 that carry handheld devices equipped with GPS trackers regardless of whether it has been put into "follow-me" mode, i.e. when it is waiting for orders. This enables it to follow any one of the people, should an order be issued by that person to follow them.

Figure 2:
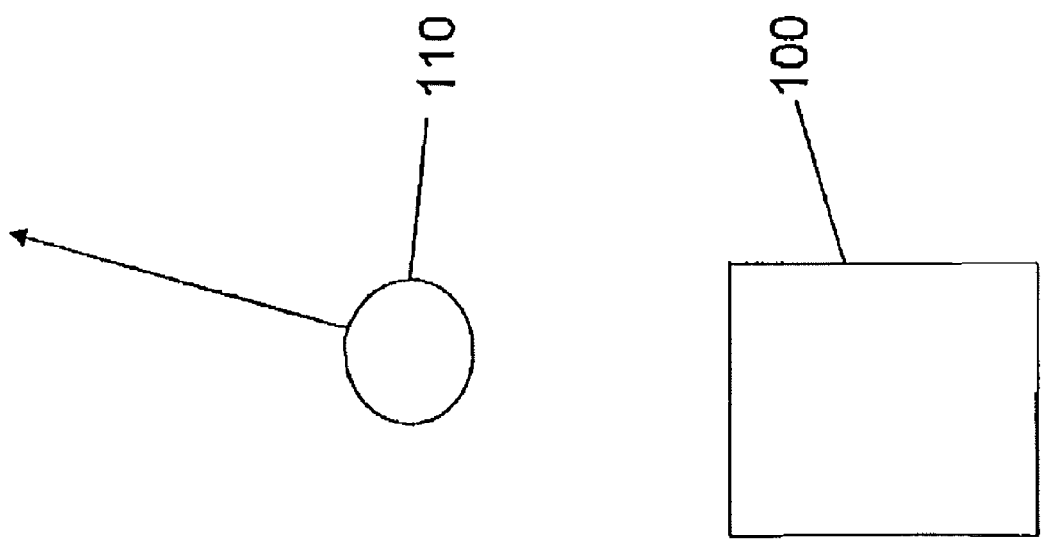
FIG. 2 is a drawing showing the illustration of FIG. 1 with the person beginning to move.

Referring now to FIG. 2, vehicle 100 has stayed in the same place as in FIG. 1 but person 110 has started moving away from the vehicle 100. At this point a digital breadcrumb 120 will be left at the position the person 110 started in.

Figure 3:
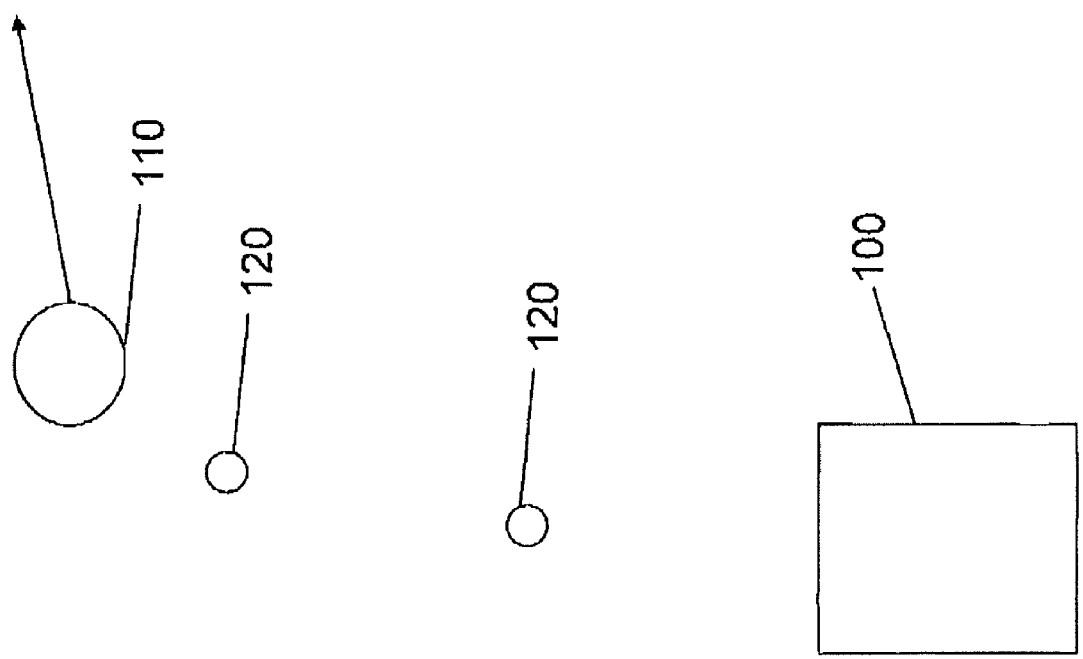
FIG. 3 is a drawing showing the illustration of FIG. 2 after the person has moved away from the vehicle and the person has left a trail of "digital breadcrumbs" at points over which he has walked.

Referring now to FIG. 3, it can be seen that person 110 has moved away from vehicle 100. Vehicle 100 has not yet started moving as the person 110 has not yet moved far enough away from the vehicle 100 to trigger the vehicle 100 to start following the person 110. The person 110, however, has started laying a trail of digital breadcrumbs 120. It should be noted that the vehicle in this instance has been programmed to only follow at a certain distance away from the person it is ordered to follow, thereby maintaining a safe distance at all times from that person to avoid colliding with that person.

Figure 4:
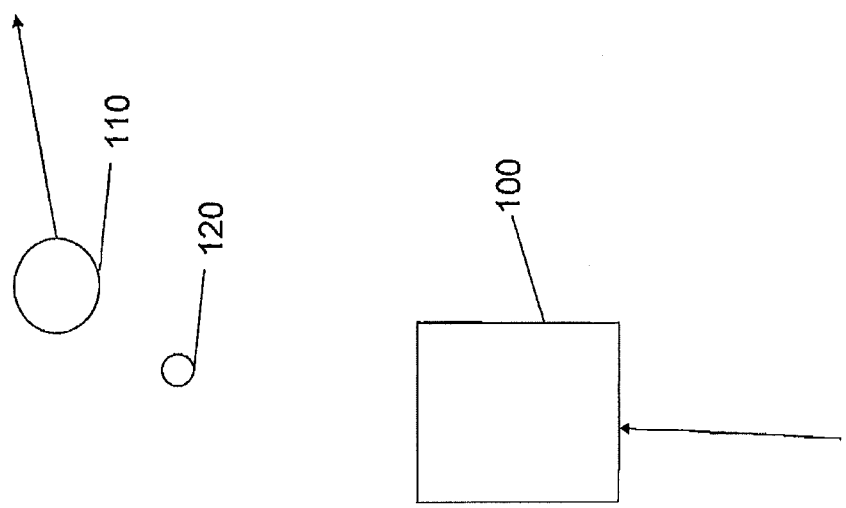
FIG. 4 is a drawing showing the illustration of FIG. 3 after the vehicle has moved to follow the person using the trail of "digital breadcrumbs"

Referring now to FIG. 4, the vehicle 100 is shown to have started moving, following a path formed by its computer based on a curve or set of curves fitted to the digital breadcrumb points 120. By following the path chosen by the person 110, it is not as necessary to fit the vehicle 100 with sensors to detect either personnel or drivable terrain as, by definition, the person will have been able to walk along the path defined by the digital breadcrumb 120.

It should be noted that not all vehicles can drive over all terrain that a person can walk over and so the person being followed by the vehicle should be instructed not to take too rugged or difficult a path to avoid the vehicle 100 getting stuck.

Further, it should also be noted that the vehicle 100 is preferably fitted with terrain-sensing abilities as a precaution against being led over difficult terrain by the person 110 it is following. It is also preferable for the vehicle 100 to be able to detect personnel and other vehicles as these could conceivably cross the virtual trail created by the digital breadcrumbs 120 of the person 110 being followed.

Figure 5:
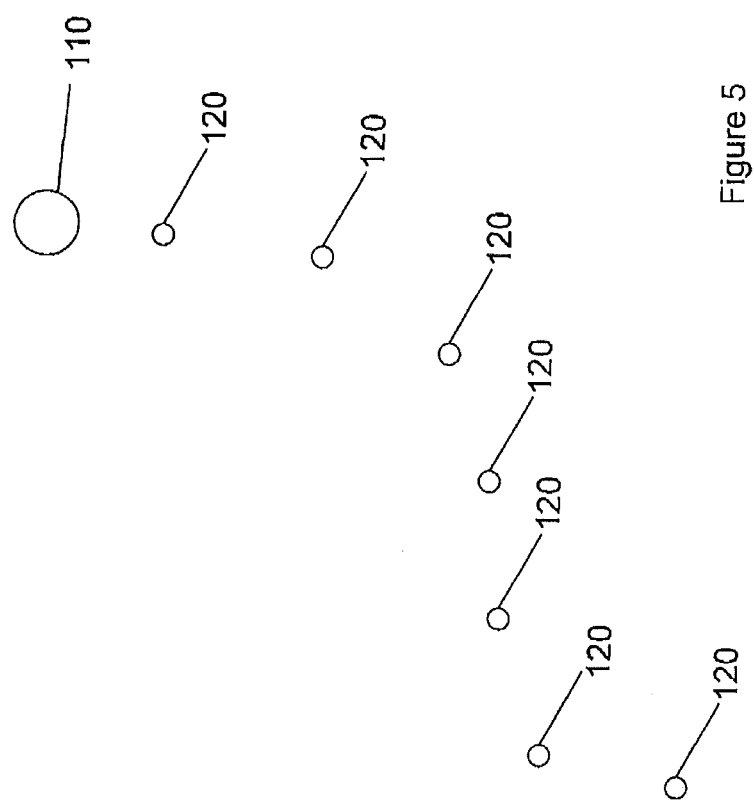
FIG. 5 is a drawing showing an illustration of a person that has left a trail of "digital breadcrumbs" over points at which he has walked.

Referring now to FIG. 5, there is shown a trail of digital breadcrumbs 120 as would be left by a person 110.

Figure 6:
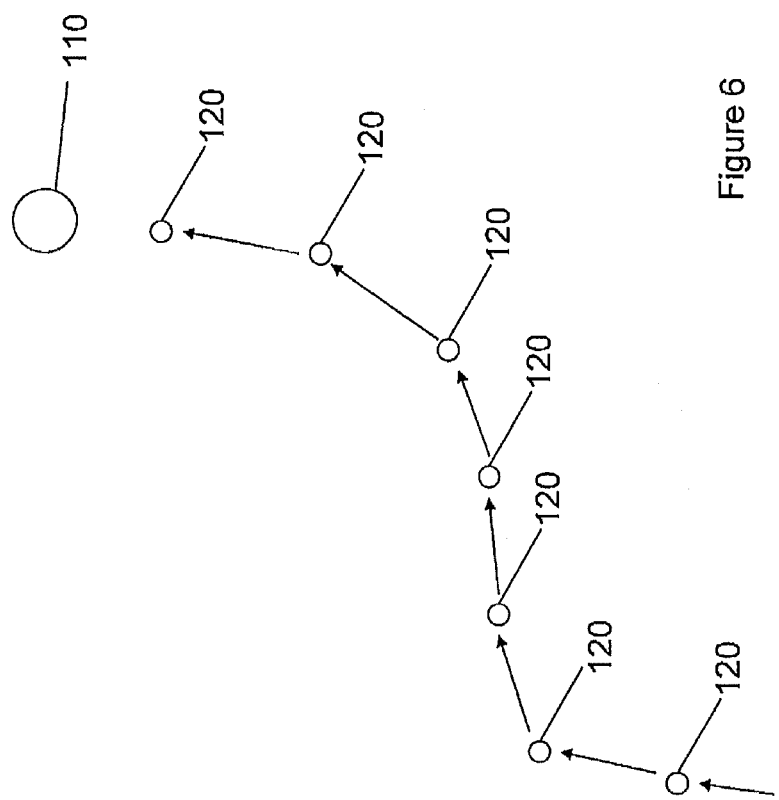
FIG. 6 is a drawing illustrating how an embodiment of the invention recreates a driveable path from the trail of "digital breadcrumbs" left by the person in FIG. 5.

Referring now to FIG. 6, there is shown the path determined by the computer that was taken by the person 110 between the digital breadcrumbs 120.

Referring now to FIG. 6, there is shown by arrowed lines the actual path taken by the person 110 between the points 120. It should be noted that the person 110 might have taken the path for various reasons, including an obstruction such as a building or a hazard such as a cliff and, in some instances, there is only a narrow path possible where, for example, buildings exist on both sides of a path and thus the vehicle 100 has to carefully follow the path taken by the person 110 it is following to avoid crashing into either building.

Figure 7:
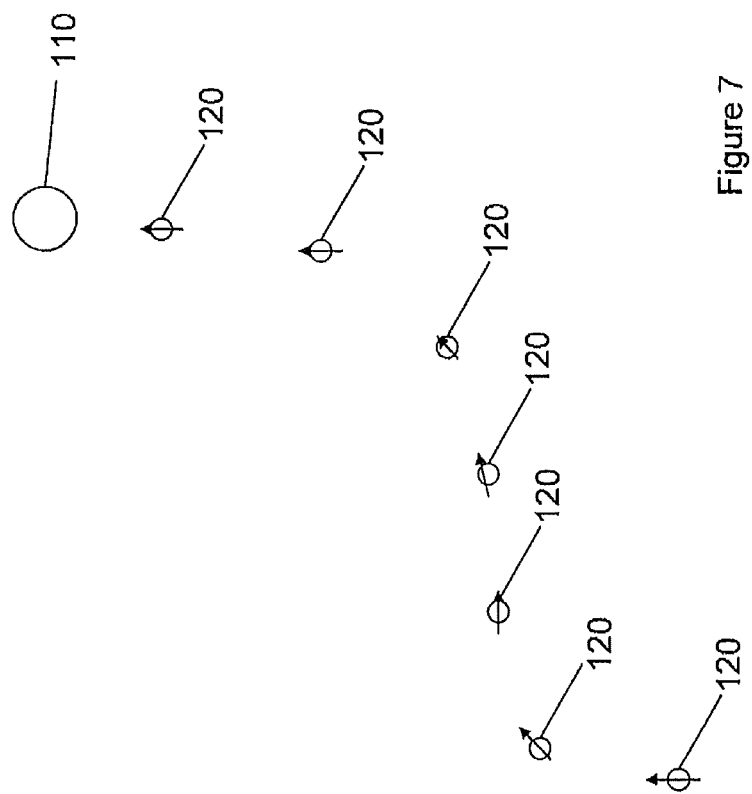
FIG. 7 is a drawing illustrating how an embodiment of the invention determines vector information for each "digital breadcrumb"

Referring now to FIG. 7, there is now shown the vectors 120 as computed by the computer(s) on-board the vehicle 100 to correspond to the actual path taken by the person 110 in FIG. 6. The path taken by the vehicle 100 will be the closest feasible path to that taken by the person 110. The exact shape of the path isn't completely predictable and will depend on a number of factors including geometry, environmental conditions and the path taken but using obstacle avoidance will ensure that the generated path is collision free.

Figure 8:
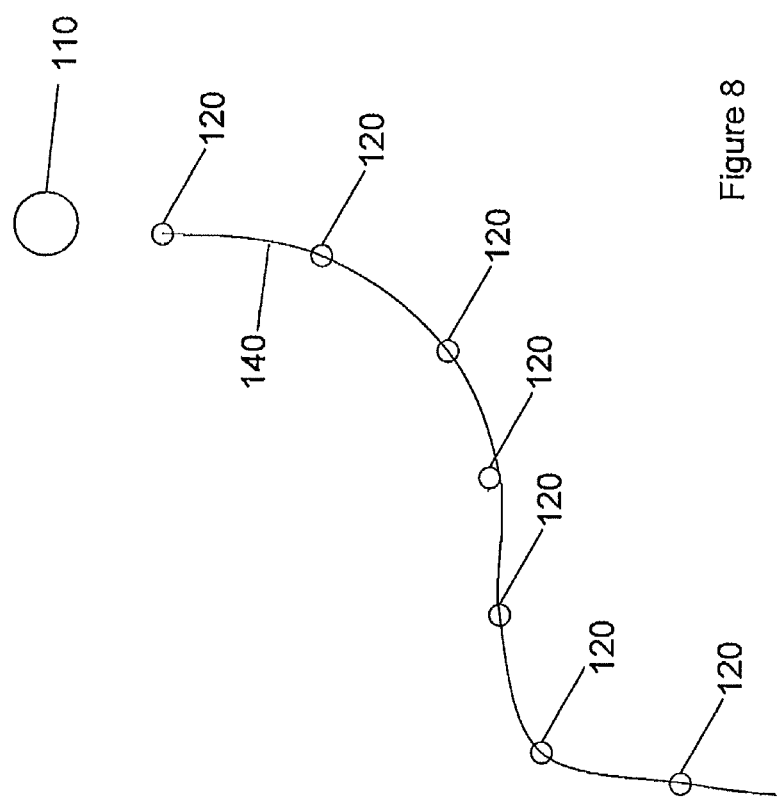
FIG. 8 is a drawing illustrating how an embodiment of the invention determines a driveable path based on the "digital breadcrumbs"

Referring now to FIG. 8, there is now shown the curve that is fitted by the computer(s) onboard the vehicle 100 to the vectors 120 determined previously shown in FIG. 7. Non-linear optimisation techniques are used to calculate two input functions v(s) and k(s) where v, is velocity, k, is curvature and s, is distance along the trajectory. By integrating k(s) the heading is calculated at a given as:

$$k(s) = k_0 + \Delta k(s)$$

-continued $$\vartheta(s) = \vartheta_0 + \Delta\vartheta(s) \text{ where } \Delta\vartheta(s) = \int_0^s k(s)ds$$

$$x(s) = x_0 + \Delta x(s) \text{ where } \Delta x(s) = \int_0^s \cos(\vartheta(s))ds$$

$$y(s) = y_0 + \Delta y(s) \text{ where } \Delta y(s) = \int_0^s \sin(\vartheta(s))ds$$

$\Delta k(s)$ is defined by a set of parameters P where the function is defined between zero and some upper limit, $s_f$. The vector Q is then defined as $[P\ s_f]$.

Non-linear programming is used to find Q such that $k(s_f)=k_f$, $l(s_f)=l_f$, $x(s_f)=x_f$, and $y(s_f)=y_f$.

Figure 9:
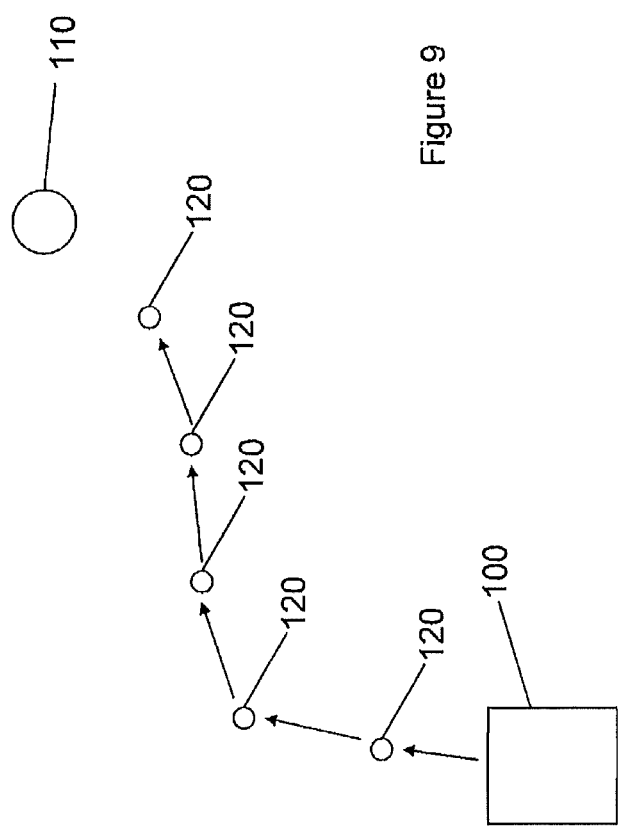
FIG. 9 is a drawing illustrating a first step in an example of how a vehicle according to an embodiment of the invention would follow a trail of "digital breadcrumbs" left by a person as they are walking.

Referring now to FIG. 9, there is shown a vehicle 100 that is about to start following person 110. The person 110 has already left a trail of digital breadcrumbs 120 and has followed a path indicated by arrowed lines shown between the digital breadcrumbs 120.

Figure 10:
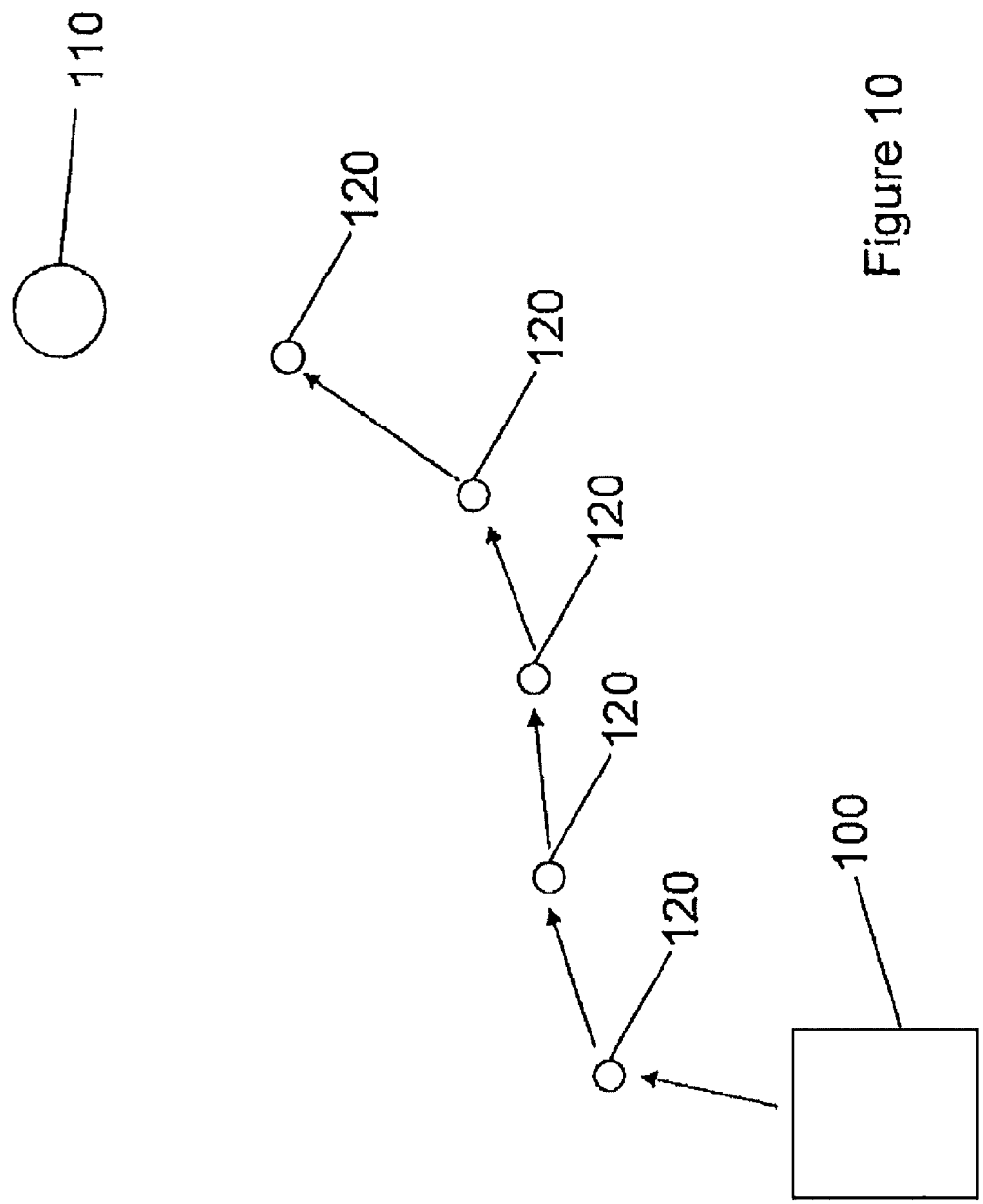
FIG. 10 is a drawing illustrating a second step of the example in FIG. 9 where the person and vehicle have advanced.

Referring now to FIG. 10, the vehicle 100 has started moving to follow a person 110. The vehicle 100 has advanced to the first digital breadcrumbs 120 so that it follows the person 110. The vehicle 100 has advanced to the first digital breadcrumb 120 in such a way so as to be angled substantially towards the next digital breadcrumb 120, as per the vectors 120' calculated in FIG. 7.

Figure 11:
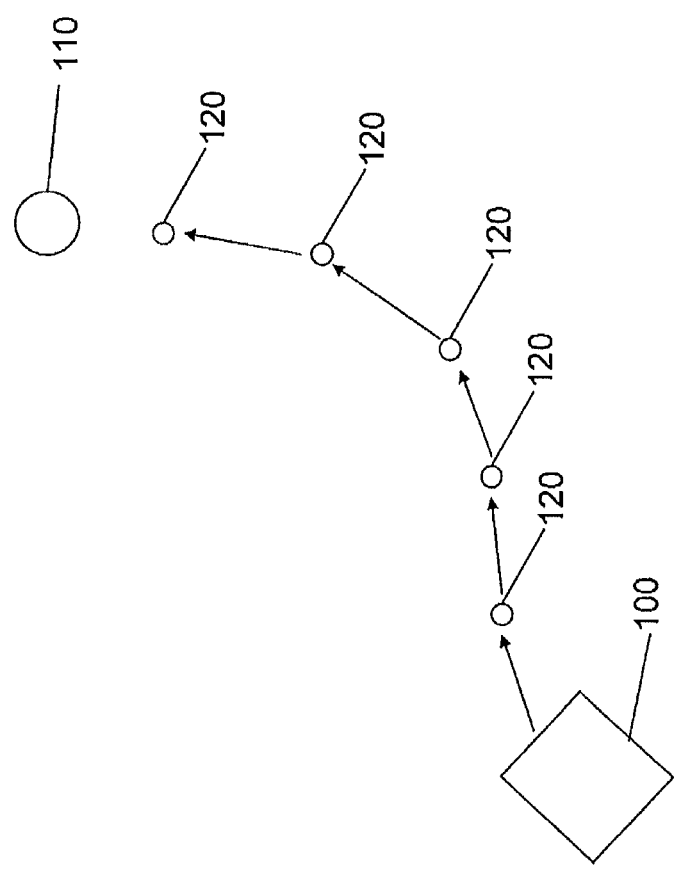
FIG. 11 is a further drawing illustrating a third step of the examples in FIGS. 9 and 10.

Referring now to FIG. 11, the vehicle 100 has now moved still further from its position in FIG. 10 along the path indicated by the digital breadcrumbs 120 so that it follows the person 110.

Whilst the person 100 being followed keeps moving, the vehicle 100 will follow the person 110 by advancing to the oldest digital breadcrumb 120 available at the same time as a new digital breadcrumb 120 is left by the person 110.

Figure 12:
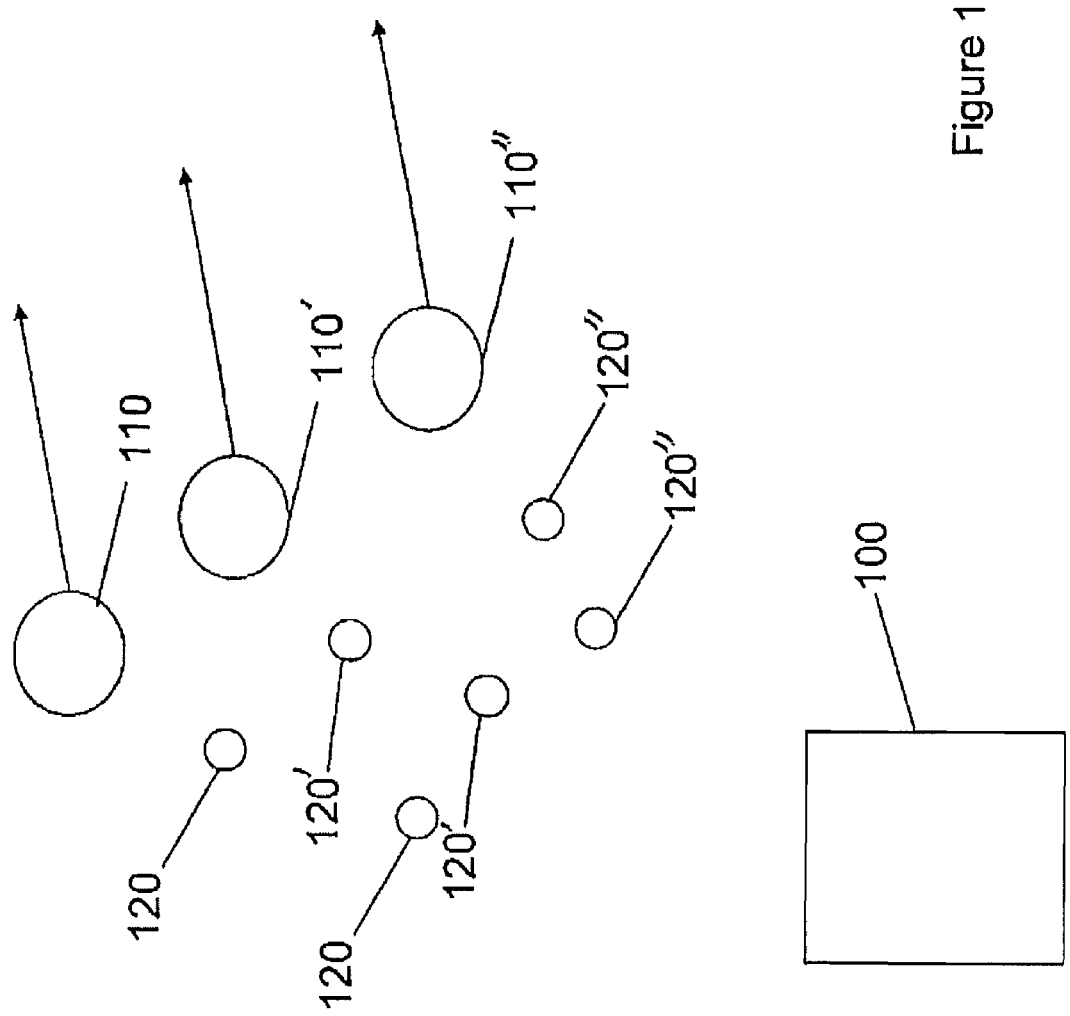
FIG. 12 is a drawing illustrating a vehicle following the "digital breadcrumbs" of a group of people.

Referring now to FIG. 12, there is shown a vehicle 100 that is following a group comprising three people 110, 110', 110", each person leaving a respective trail of "digital breadcrumbs" 120, 120', 120". It will be understood that the system can be configured to store data relating to digital breadcrumbs left by any reasonable number of people. The system may follow one person in the group based on several options, for example: follow a nominated person in the group, follow a weighted, or other, average, or follow the centre of mass or centroid (i.e. the point whose coordinates are the mean values of the coordinates of all the persons of the group) of the group. Another option is to automatically switch between persons in the group based on an operational context, e.g. switch from a first person to a second person if the first person moves away from the group for some reason, such as to protect themselves from enemy fire.

Referring now to FIG. 13, there is shown a situation where the vehicle 100 has been ordered by the person 110 to "task on" the person 110, that is to say to proceed directly to that person 110 and to ignore following the path taken by that person as indicated by the digital breadcrumbs 120.

Figure 14:
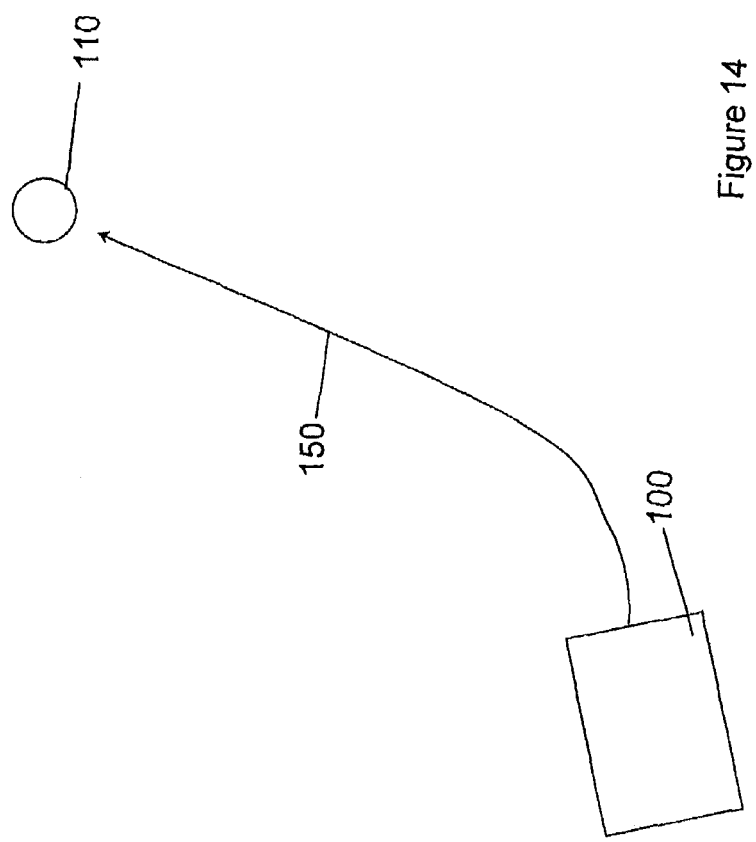
FIG. 14 is a drawing illustrating the second step of the process stated in FIG. 13, where the vehicle computes a path to the specific point.

Referring now to FIG. 14, there is illustrated the path determined by the vehicle 100 as the shortest driveable path to the person 100.

It should also be noted that the one or more of the handheld devices carried by the one or more persons 110 can be used to remotely drive the vehicle 100 if necessary.

To determine a driveable path using curve fitting, a graph is used to store a family of possible trajectories (trajectories are defined mathematically using the derivation above, and are such that the vehicle is able to drive them i.e. they obey minimum turning circle, etc.). Then this is mapped as a goal location to a vertex in the graph (the goal location is the vertex in the graph which is closest to the soldiers current location). Standard graph search techniques (e.g. A*) are used to select a sequence of edges, in this case trajectories, which reach the desired goal. During the search, each edge is evaluated against a set of cost maps such that the lowest cost solution is found i.e. edges which travel through obstacles are very high cost, edges which don't align with the path walked are high cost, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system for controlling a vehicle to follow at least one person, the system including:
    a detection device for detecting a location of the at least one person;
    a storage device for recording locations of the at least one person at a plurality of points in time;
    a path determination device for determining a driveable path for the vehicle based on the recorded locations; and
    a control device for operating said vehicle to follow location movements of said at least one person over the driveable path,
    wherein the detection device and the storage device are provided for detecting and storing location data for a plurality of persons and are configured to follow location movements of one person selected from amongst the plurality of persons,
    wherein the system is configured to select said one person to follow the location movements of based on a plurality of system operating modes, and
    wherein one of the plurality of system operating modes includes following a computed centroid of the plurality of persons, wherein the computed centroid is a point whose coordinates are mean values of the coordinates of all the plurality of persons.

2. The system according to claim 1, wherein the detection device is configured for detecting a location signal transmitted by at least one GNSS or GPS enabled device that transmits location signals at intervals in time.

3. The system according to claim 1, wherein the system operating modes include:
    following a nominated person;
    and
    automatically switching between the plurality of persons based on a specified operational context.

4. The system according to claim 1, wherein the system is configured, if ordered, to stop following said one person and start following another person, provided the system has been recording locations of both the one person and the other person in order to determine the driveable path.

5. The system according to claim 1, wherein the path determination device is configured in receiving signals from the detection device to determine a path that avoids collision with a person or avoids un-driveable terrain.

6. The system according to claim 1, wherein the path determination device is configured for:
    computing vectors corresponding to stored locations of the at least one person being followed; and performing a curve-fitting operation to determine a path between the stored locations.

7. The system according to claim 6, further comprising non-linear optimisation processes for calculating a vector between a pair of said stored locations.

8. The system according to claim 1, in combination with a vehicle.

9. The system according to claim 8, wherein the vehicle is at least partially autonomous.

10. A method of controlling a vehicle to follow at least one person, the method comprising:
   detecting a location of a plurality of persons;
   recording locations of said plurality of persons at a plurality of points in time;
   selecting one person to follow location movements of from amongst the plurality of persons,
   wherein said one person is selected based on a plurality of system operating modes, and
   wherein one of the plurality of system operating modes includes following a computed centroid of the plurality of persons, wherein the computed centroid is a point whose coordinates are mean values of the coordinates of all the plurality of persons;
   determining a driveable path for the vehicle based on the recorded locations of said one person; and
   operating the vehicle to follow the location movements of said one person over the driveable path.

11. A non-transitory computer-readable medium storing instructions, which when executed by a processor, cause the processor to perform a method of controlling a vehicle to follow at least one person, the method comprising:
   detecting a location of a plurality of persons;
   recording locations of said plurality of persons at a plurality of points in time;
   selecting one person to follow location movements of from amongst the plurality of persons,
   wherein said one person is selected based on a plurality of system operating modes, and
   wherein one of the plurality of system operating modes includes following a computed centroid of the plurality of persons, wherein the computed centroid is a point whose coordinates are mean values of the coordinates of all the plurality of persons;
   determining a driveable path for the vehicle based on the recorded locations of said one person; and
   operating the vehicle to follow the location movements of said one person over the driveable path.

* * * * *